Figure 2:
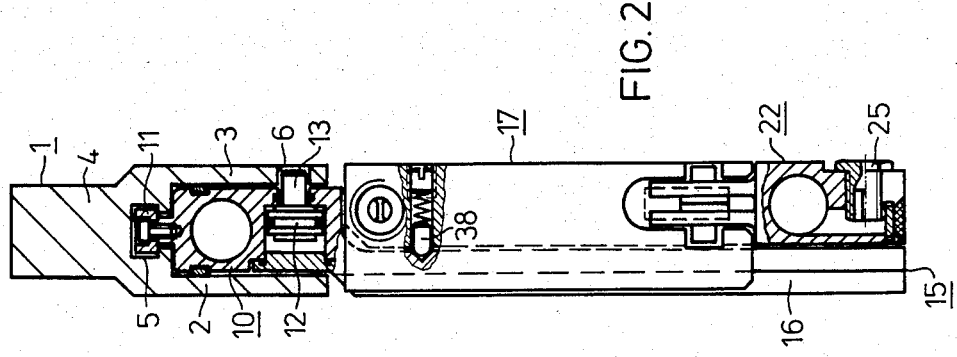

United States Patent [19]

Weber et al.

[11] Patent Number: 4,640,346
[45] Date of Patent: Feb. 3, 1987

[54] TUBE LANE MANIPULATOR FOR THE HIGH-PRESSURE BLOW-DOWN OF HEAT EXCHANGERS

[75] Inventors: Robert Weber, Uttenreuth; Josef Forster, Bubenreuth, both of Fed. Rep. of Germany

[73] Assignee: Kraftwerk Union Aktiengesellschaft, Mülheim, Fed. Rep. of Germany

[21] Appl. No.: 843,713

[22] Filed: Mar. 25, 1986

[30] Foreign Application Priority Data

Mar. 29, 1985 [DE] Fed. Rep. of Germany ....... 3512100

[51] Int. Cl.$^4$ .............................................. F22B 37/52
[52] U.S. Cl. .................................... 165/95; 15/316 R; 122/382; 122/390; 122/392
[58] Field of Search .................. 122/382, 390, 392; 15/316 R, 317; 165/95; 134/166 R

[56] References Cited

U.S. PATENT DOCUMENTS

| 4,248,180 | 2/1981 | Sullivan et al. | 122/390 |
| 4,407,236 | 10/1983 | Schukei et al. | 122/382 X |
| 4,492,187 | 1/1985 | Hammond | 122/390 |
| 4,572,284 | 2/1986 | Katscher et al. | 122/392 X |

FOREIGN PATENT DOCUMENTS

| 0084867 | 3/1983 | European Pat. Off. | |
| 956971 | 1/1957 | Fed. Rep. of Germany | |
| 961651 | 4/1957 | Fed. Rep. of Germany | |
| 2615433 | 9/1976 | Fed. Rep. of Germany | |
| 2514173 | 2/1977 | Fed. Rep. of Germany | |

Primary Examiner—Edward G. Favors
Attorney, Agent, or Firm—Herbert L. Lerner; Laurence A. Greenberg

[57] ABSTRACT

A tube lane manipulator for the high-pressure blow-down of heat exchangers with tubes spaced apart by a given tube pitch includes a guide rail extended along the tube lane having a vertical leg with holes formed therein at mutual spacings substantially matched to the tube pitch; a stepping mechanism extended along and locked to the guide rail, the stepping mechanism including two stepping mechanism members, a device for executing steps of a length substantially matched to the tube pitch, clamping feet in the form of posts, and a device for extending the posts into the holes formed in the vertical leg for fixing the stepping mechanism members in a position provided by the steps; a spraying head carrier coupled to one of the stepping mechanism members, a spraying head holder, a device for telescopically extending and guiding the spraying head holder along the spraying head carrier in a direction perpendicular to the guide rail, and a spraying head with at least one spraying nozzle disposed on the spraying head holder.

4 Claims, 2 Drawing Figures

U.S. Patent  Feb. 3, 1987  4,640,346

TUBE LANE MANIPULATOR FOR THE HIGH-PRESSURE BLOW-DOWN OF HEAT EXCHANGERS

The invention relates to the field of service technology for heat exchangers and can be used in the mechanical construction of a manipulator which can be moved along the tube lane and is equipped with spraying nozzles for the high-pressure blow-down of the heat exchanger.

One conventional tube lane manipulator for the high-pressure blow-down of heat exchangers, includes a spraying head containing the spraying nozzles which is moved by a two-piece stepping mechanism, the stepping mechanism having stepping mechanism members each of which are equipped with at least one pair of clamping feet. The clamping feet can be locked to tubes extended along both sides of the tube lane. If the width of the tube lane is diminished by internal parts such as tie rods, the stepping mechanism can be combined with an L-shaped guide rail, having a leg perpendicular to the tube sheet of the heat exchanger which forms the support of the stepping mechanism on one side of the tube lane. The stepping mechanism and the guide rail mesh in a form-locking manner by means of a slot-and-key configuration. A form-locking connection is one which is accomplished by the shape of the parts themselves, as opposed to a force-locking connection which requires outside force. In this special configuration of the manipulator, the step length of the stepping mechanism is matched to the tube pitch along the tube lane. Otherwise, a spraying head carrier couples one stepping mechanism member to a spraying head holder which can be moved perpendicularly to the guide rail and is guided at the spraying head carrier. The spraying head holder carries the spraying head proper which has one or more spraying nozzles, as described in Published European Patent Application No. 0 048 867, corresponding to U.S. application Ser. No. 460,859, now U.S. Pat. No. 4,572,284, especially FIGS. 9 to 11 thereof.

In certain heat exchangers, the tube lane is additionally obstructed by internal parts such as domes, piping or support rods. In these cases, the conventional tube lane manipulators cannot be used.

It is accordingly an object of the invention to provide a tube lane manipulator for the high-pressure blow-down of heat exchangers, which overcomes the hereinafore-mentioned disadvantages of the heretofore-known devices of this general type, and to do so in such a manner that it can be brought through a heat exchanger tube lane which is obstructed at the bottom.

With the foregoing and other objects in view there is provided, in accordance with the invention, a tube lane manipulator for the high-pressure blow-down of heat exchangers with tubes spaced apart by a given tube pitch, comprising a guide rail extended along the tube lane having a vertical leg with holes formed therein at mutual spacings substantially matched to the tube pitch; a stepping mechanism extended along and form-lockingly connected to the guide rail, the stepping mechanism including two stepping mechanism members, means for executing steps of a length substantially matched to the tube pitch, clamping feet in the form of posts, and means for extending the posts into the holes formed in the vertical leg for fixing the stepping mechanism members in a position provided by the steps; a spraying head carrier coupled to one of the stepping mechanism members, a spraying head holder, means for telescopically extending and guiding the spraying head holder along the spraying head carrier in a direction perpendicular to the guide rail, and a spraying head with at least one spraying nozzle disposed on the spraying head holder.

In a tube lane manipulator constructed in this manner, the guide rail is disposed above the tube sheet and the stepping mechanism with the spraying head carrier and the spraying head is hung into the guide rail. The orientation of the stepping mechanism at the tube pitch is given by the holes in the guide rail, the spacings of which correspond to the tube pitch. Because the spraying head holder can be extended in telescope fashion, the holder can be run up as far as necessary in the vicinity of the internal parts fastened to the tube sheet and can be lowered on both sides of the internal parts as low as necessary without collision of the spraying head carrier with the internal parts.

In order to provide the telescope-like extendability of the spraying head holder, the spraying head carrier and the spraying head holder may have about the same length and be moved parallel to each other. Therefore, in accordance with another feature of the invention, the telescopically extending and guiding means is in the form of a pinion supported by the spraying head holder and a rack disposed on the spraying head carrier and meshed with the pinion.

In accordance with a concomitant feature of the invention, the telescopically extending and guiding means include at least one spring-loaded detent pin disposed on the spraying head holder cooperating with a row of detent holes formed in the spraying head carrier. This is done to ensure different locking heights or levels of the spraying head holder.

A multiple telescope or a scissor linkage can also be used in order to enable the spraying head holder to be extended.

Other features which are considered as characteristic for the invention are set forth in the appended claims.

Although the invention is illustrated and described herein as embodied in a tube lane manipulator for the high-pressure blow-down of heat exchangers, it is nevertheless not intended to be limited to the details shown, since various modifications and structural changes may be made therein without departing from the spirit of the invention and within the scope and range of equivalents of the claims.

Figure 1:
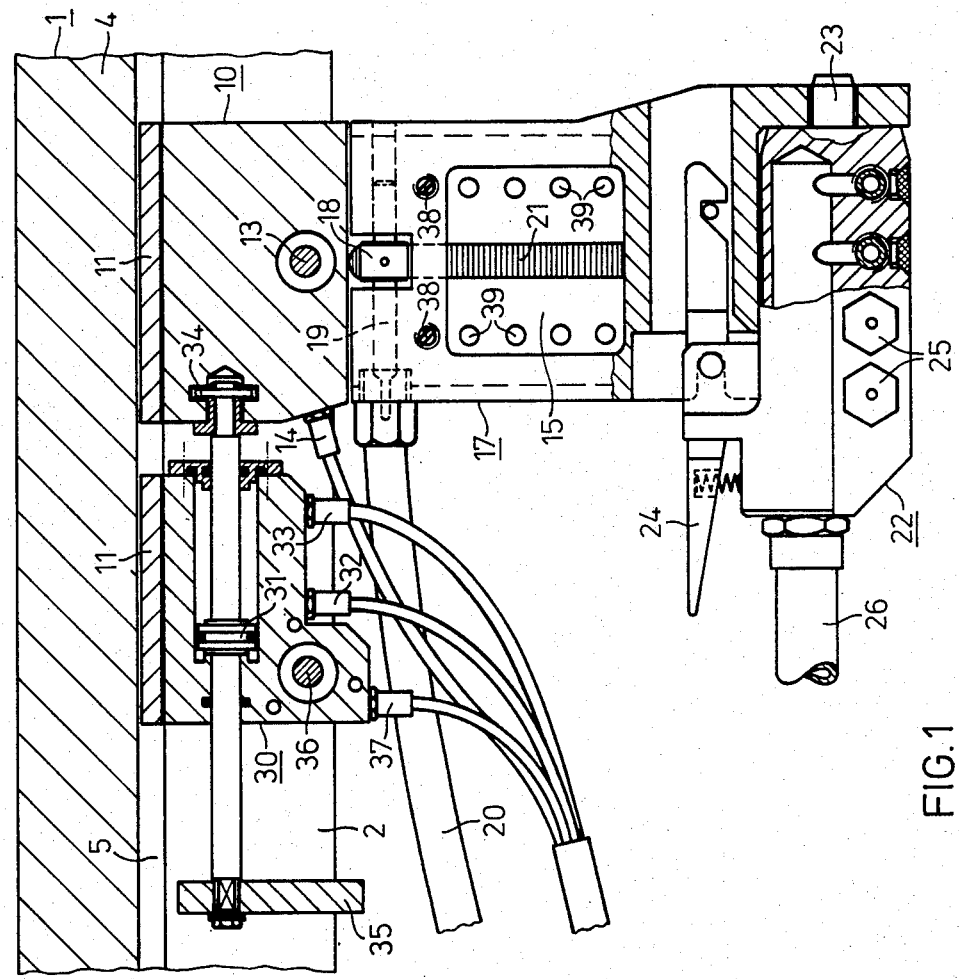

The construction and method of operation of the invention, however, together with additional objects and advantages thereof will be best understood from the following description of specific embodiments when read in connection with the accompanying drawings, in which:

FIG. 1 is a fragmentary, diagrammatic, cross-sectional view, partly broken away, of the new tube lane manipulator according to the invention; and FIG. 2 is another partly broken away cross-sectional view of the device.

Referring now in detail to FIGS. 1 and 2 of the drawings as a whole, there is seen a guide rail 1, into which a stepping mechanism with two stepping mechanism members 10 and 30 is hung. A spraying head carrier 15 with a spraying head holder 17 and a spraying head 22 fastened thereto, are located at the front stepping mechanism member 10.

The guide rail 1 is U-shaped, defining two legs 2 and 3 and a base part 4 having a slot 5 formed therein. The base part 4 is engaged in a form-locking manner by a key 11 which is disposed in the slot 5 and fastened to the front stepping mechanism member 10 as well as to the rear stepping mechanism member 30. A form-locking connection is one which is accomplished by the shape of the parts themselves, as opposed to a force-locking connection which requires outside force. The leg 3 of the guide rail 1 has holes 6 formed therein which can be engaged by posts 13. The posts are disposed at a lifting piston 12 which is located in the stepping mechanism member 10 and which receives pressure or suction (underpressure) through a hydraulic connection 14. The front stepping mechanism member 10 is integral with the spraying head carrier 15 which is provided with tracks 16 at the sides thereof. A pinion 18 which is supported in the spraying head holder 17 has a shaft 19 which can be connected to a flexible shaft 20. The pinion 18 meshes with a rack 21 which is fastened to the spraying head carrier 15 or is machined into the carrier. The fixation of the spraying head holder 17 in different positions on the spraying head carrier 15 is assured by means of two spring-loaded detent pins 38 which are disposed in the spraying head holder 17 and can snap into a row of detent holes 39 in the spraying head carrier 15.

The spraying head 22 proper is fastened to the lower end of the spraying head holder 17 by means of a post 23 and a spring-loaded lever 24 which can be snapped in. The spraying head is provided with four spraying nozzles 25 which are fed by a liquid connection 26.

Instead of the short nozzles 25 shown, nozzles with a substantially greater nozzle length can be used as long as they can be tilted. The nozzles must then point downward in the rest condition and must be swung up through 90° in the operating state. This can be accomplished, for instance, by means of a Bowden cable.

The rear stepping mechanism member 30 is equipped with the actual drive of the stepping mechanism, for the step-wise movement of the tube lane manipulator along the guide rail 1. This drive is formed of a hydraulic lifting piston 31 with associated hydraulic connections 32 and 33. A post 34 is provided at the front end of the lifting piston 31, which can snap into a corresponding opening in the front end of the stepping mechanism member 10. A door-handle-type lever 35 is provided at the rear end of the lifting piston for actuating the post. During the operation of the tube lane manipulator, the lever is locked by the two legs of the guide rail 1. The rear stepping mechanism member 30 has a lifting piston with a post 36, provided in the same manner as the piston and post in the front stepping mechanism member 10. The post 36 can likewise engage the holes 6 in the leg 3 of the guide rail 1. A hydraulic connection 37 is provided for actuating this post.

In the illustrated embodiments, the stepping mechanism is constructed in such a way that the length of the steps and therefore the stroke of the lifting piston 31 amounts to one-third of the distance which prevails between the two extendable posts 13 and 36, in the rest condition of the stepping mechanism. The step length in this case corresponds to the tube pitch of the heat exchanger in the tube lane.

The guide rail 1 is fixed in the heat exchanger to corresponding internal parts of the heat exchanger. If the tube lane is only accessible through a hand hole at one end of the tube lane, the guide rail can be provided with a base support which can be flapped out, at the end thereof away from the hand hole. In any case, it must be ensured that the holes 6 in the leg 3 of the guide rail agree with the tube pitch in the heat exchanger along the tube lane. This can be achieved, for instance, by means of prismatic jaws which are fastened along the guide rail and are supported in the assembled condition by at least two heating tubes of the heat exchanger.

The foregoing is a description corresponding in substance to German Application No. P 35 12 100.9, filed Mar. 29, 1985, the International priority of which is being claimed for the instant application, and which is hereby made part of this application. Any material discrepancies between the foregoing specification and the afore-mentioned corresponding German application are to be resolved in favor of the latter.

We claim:

1. Tube lane manipulator for the high-pressure blowdown of heat exchangers with tubes spaced apart by a given tube pitch, comprising a guide rail extended along the tube lane having a vertical leg with holes formed therein at mutual spacings substantially matched to the tube pitch; a stepping mechanism extended along and locked to said guide rail, said stepping mechanism including two stepping mechanism members, means for executing steps of a length substantially matched to the tube pitch, clamping feet in the form of posts, and means for extending said posts into said holes formed in said vertical leg for fixing said stepping mechanism members in a position provided by said steps; a spraying head carrier coupled to one of said stepping mechanism members, a spraying head holder, means for telescopically extending and guiding said spraying head holder along said spraying head carrier in a direction perpendiculer to said guide rail, and a spraying head with at least one spraying nozzle disposed on said spraying head holder.

2. Tube lane manipulator according to claim 1, including means for form-lockingly interconnecting said stepping mechanism and said guide rail.

3. Tube lane manipulator according to claim 1, wherein said telescopically extending and guiding means is in the form of a pinion supported by said spraying head holder and a rack disposed on said spraying head carrier and meshed with said pinion.

4. Tube lane manipulator according to claim 3, wherein said telescopically extending and guiding means include at least one spring-loaded detent pin disposed on said spraying head holder cooperating with a row of detent holes formed in said spraying head carrier.

* * * * *